(12) United States Patent
Sisley (10) Patent No.: US 7,922,012 B2
(45) Date of Patent: Apr. 12, 2011

(54) CABLE TRAY

(75) Inventor: Peter D. Sisley, Toronto (CA)

(73) Assignee: Power Bus Way Ltd., Brampton, Ontario (CA)

( * ) Notice: Subject to any disclaimer, the term of this patent is extended or adjusted under 35 U.S.C. 154(b) by 36 days.

(21) Appl. No.: 12/178,964

(22) Filed: Jul. 24, 2008

(65) Prior Publication Data

US 2010/0019106 A1 Jan. 28, 2010

(51) Int. Cl.
*A47F 1/04* (2006.01)

(52) U.S. Cl. ....... 211/60.1; 248/68.1; 248/73; 248/74.1; 248/74.3; 211/70.4; 211/59.4; 211/26; 220/4.28; 220/4.33; 220/677; 220/683; 220/693

(58) Field of Classification Search ................ 248/68.1, 248/73, 74.1, 74.3; 211/60.1, 70.4, 59.4, 211/26; 220/4.28, 4.33, 677, 683, 693
See application file for complete search history.

(56) References Cited

U.S. PATENT DOCUMENTS

| 1,133,976 | A | * | 3/1915 | Kraus | 248/68.1 |
|---|---|---|---|---|---|
| 2,361,943 | A | | 11/1944 | Issoglio | |
| 2,362,124 | A | | 11/1944 | Ellinwood | |
| 2,417,260 | A | * | 3/1947 | Morehouse | 174/135 |
| 3,448,955 | A | | 6/1969 | Fussell | |
| 3,531,071 | A | * | 9/1970 | Kubli | 248/68.1 |
| 3,592,427 | A | * | 7/1971 | Misuraca | 248/68.1 |
| 3,618,882 | A | | 11/1971 | Podedworny | |
| 3,695,563 | A | * | 10/1972 | Evans | 248/56 |
| 4,378,923 | A | * | 4/1983 | Takei | 248/68.1 |
| 4,610,362 | A | * | 9/1986 | Remp et al. | 211/59.4 |
| 4,706,822 | A | * | 11/1987 | Remp et al. | 211/59.4 |
| 4,733,986 | A | * | 3/1988 | Kenning et al. | 403/306 |
| 4,802,643 | A | | 2/1989 | Uys | |
| 5,123,547 | A | * | 6/1992 | Koch | 211/59.4 |
| 5,377,939 | A | * | 1/1995 | Kirma | 248/68.1 |
| 5,433,322 | A | * | 7/1995 | Williams | 206/443 |
| 5,470,021 | A | | 11/1995 | Looney | |
| 5,981,101 | A | * | 11/1999 | Stone | 429/100 |
| 5,992,802 | A | * | 11/1999 | Campbell | 248/68.1 |
| 6,053,456 | A | * | 4/2000 | Dispenza | 248/56 |
| 6,173,926 | B1 | * | 1/2001 | Elvegaard | 248/74.1 |
| 6,313,405 | B1 | * | 11/2001 | Rinderer | 174/68.3 |
| 6,561,466 | B1 | * | 5/2003 | Myers et al. | 248/74.4 |
| 7,080,864 | B2 | * | 7/2006 | Casteran | 294/67.3 |
| 7,530,536 | B2 | * | 5/2009 | Hashimoto | 248/68.1 |

FOREIGN PATENT DOCUMENTS

CA 2137879 6/1995

\* cited by examiner

*Primary Examiner* — Anita M King
*Assistant Examiner* — Nkeisha J Smith (57) ABSTRACT

A cable tray has a pair of opposed side rails with a pair of aligned through bores. One or more stacked cable support blocks extend between the opposed side rails. A lower rung extends between the rails at the pair of aligned through bores. The lower rung has an upwardly opening channel extending along its length receiving the bottom edge of a lowermost one of the cable support blocks. The lower rung also has at least one opening extending through the lower rung in alignment with the pair of aligned through bores. A fastener extends through at least one opening of the lower rung and through at least one of the pair of aligned through bores in the side rails.

17 Claims, 7 Drawing Sheets

CABLE TRAY

BACKGROUND OF THE INVENTION

The present invention relates to cable trays for use with electrical cables.

Cable trays are used to support electrical cables which run through factories and other structures. Cable trays may have straight and (horizontally and vertically) curved sections to accommodate the installation requirements of a particular setting.

One type of known cable tray has a pair of parallel side rails or stringers that are interconnected with a plurality of transverse rungs at predetermined intervals along the length of the parallel side rails. Cables are laid on top of the rungs. The rungs are typically attached to the side rails by fasteners, or are welded to the side rails. The parallel side rails may be joined end-to-end by a splice plate or a connecting bar. However, since these cable trays generally do not secure the cables in spaced relation to each other, they may be unsuitable for use with high power cables where there may be a need to keep the cables cool, or to prevent the cables flailing in the event of a fault or short circuit.

A cable tray more suited to high power cables is disclosed in U.S. Pat. No. 3,618,882 to Podedworny. In Podedworny, two abutting support blocks with semi-circular cut-outs on adjacent faces provide a housing with cylindrical openings that confine the cables in spaced relation in the cable tray. The blocks are secured to each other and to a rung by bolts extending vertically through the blocks and into the rung.

To install the type of cable tray disclosed by Podedworny, lower support blocks may be placed on rungs with their semi-circular face facing upwardly and the lower support blocks may be temporarily held in place by bolts. Cables may then be laid into the semi-circular channels without risk of the support blocks shifting or falling over. Next, the bolts may be removed, the upper support blocks set in place and the bolts again inserted to complete the assembly. This manner of assembly is time consuming and may become difficult where the tray has a large vertical curve. More specifically, with a large vertical curve, as it becomes hard to keep a lower support block properly positioned while the bolts are inserted and there is also a risk of the lower support block shifting when the bolts are removed preparatory to installing the upper support blocks.

SUMMARY

The present invention seeks to provide a cable tray which is easier to install.

In accordance with an embodiment of the present invention, a cable tray has a pair of opposed side rails with a pair of aligned through bores. One or more stacked cable support blocks extend between the opposed side rails. A lower rung extends between the rails at the pair of aligned through bores. The lower rung has an upwardly opening channel extending along its length receiving the bottom edge of a lowermost one of the cable support blocks. The lower rung also has at least one opening extending through the lower rung in alignment with the pair of aligned through bores. A fastener extends through at least one opening of the lower rung and through at least one of the pair of aligned through bores in the side rails.

These and other features, aspects, and advantages of the present invention will become better understood with reference to the following description in conjunction with the drawings.

BRIEF DESCRIPTION OF THE DRAWINGS

In the figures which illustrate example embodiments of the invention.

DESCRIPTION

Figure 1:
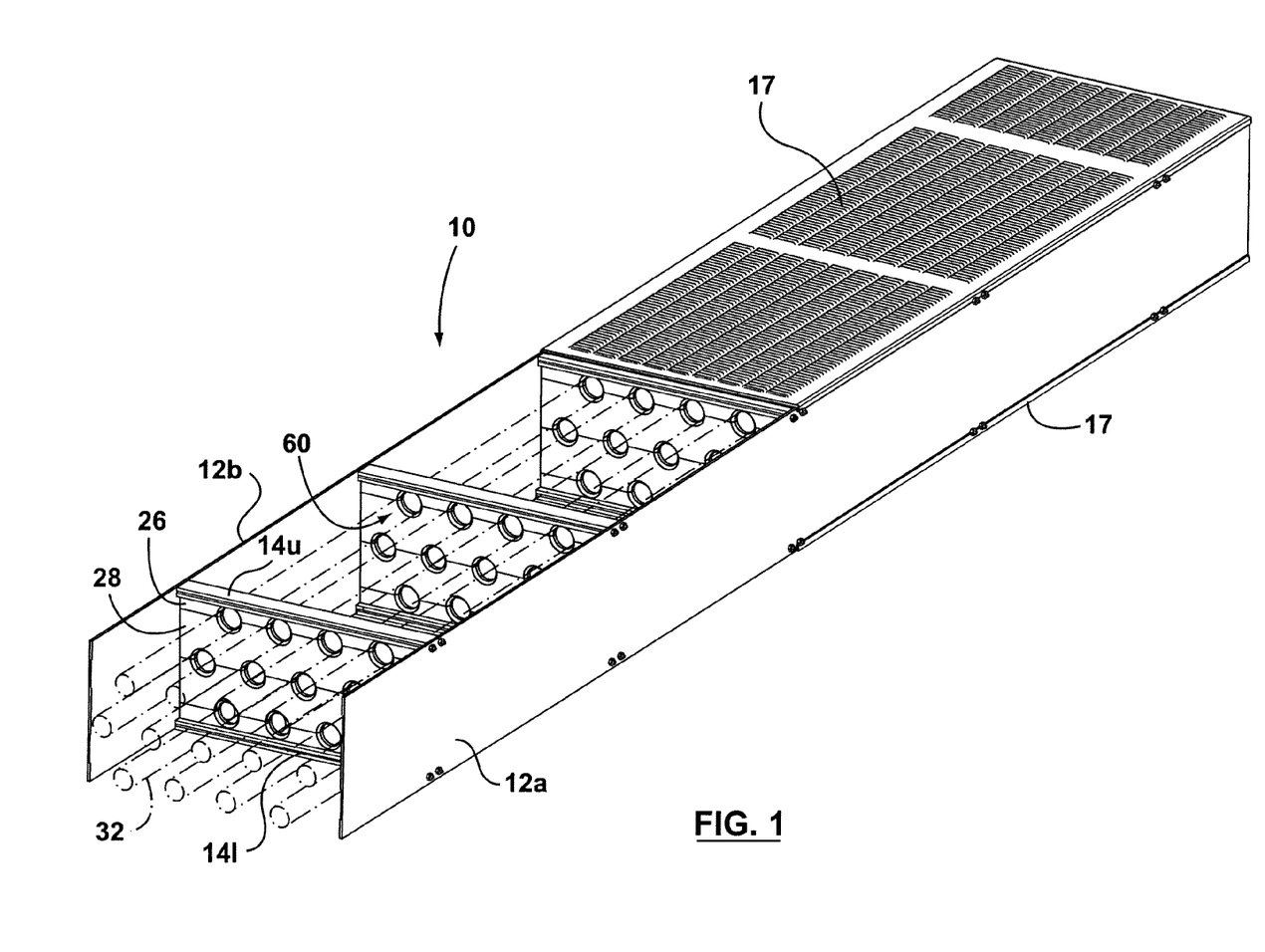
FIG. 1 is a perspective view of a cable tray made in accordance with this invention.

Referring to FIG. 1, a cable tray 10 has a pair of opposed side rails 12a and 12b to which are attached opposed pairs of lower and upper rungs 14L, 14U. A plurality of cable support blocks 26, 28 are held in place by each pair of rungs, and cables 32 extend through cylindrical openings formed by the support blocks. Vented covers 17 may be attached to the upper and lower rungs 14U, 14L.

Figure 2:
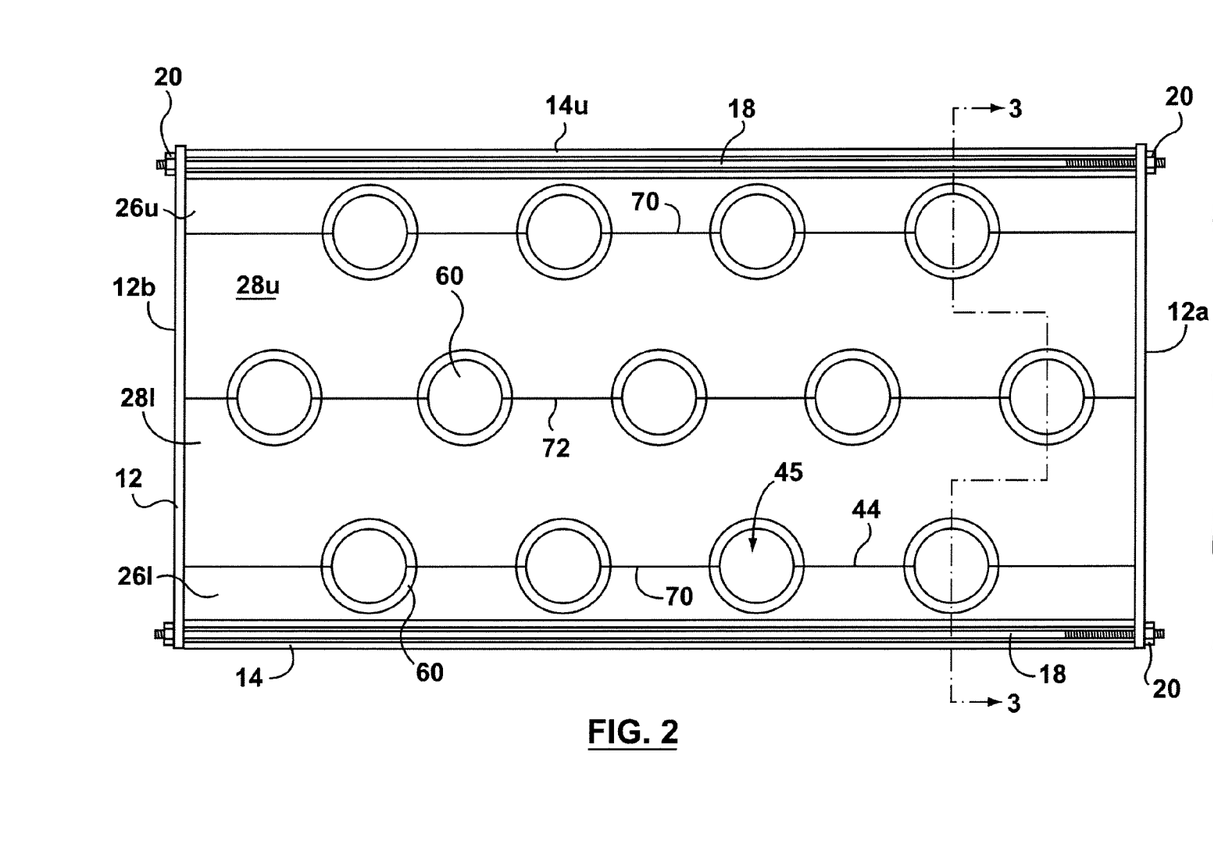
FIG. 2 is a front view of the cable tray of FIG. 1.
Figure 3:
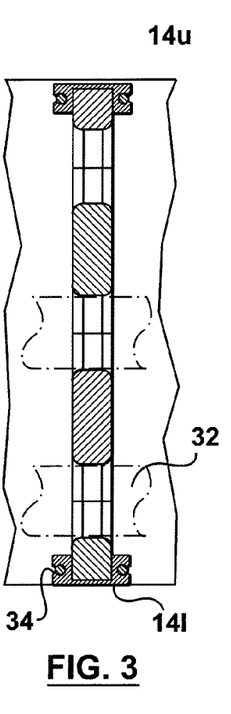
FIG. 3 is a cross-sectional view along the lines 3-3 in FIG. 2.
Figure 3A:
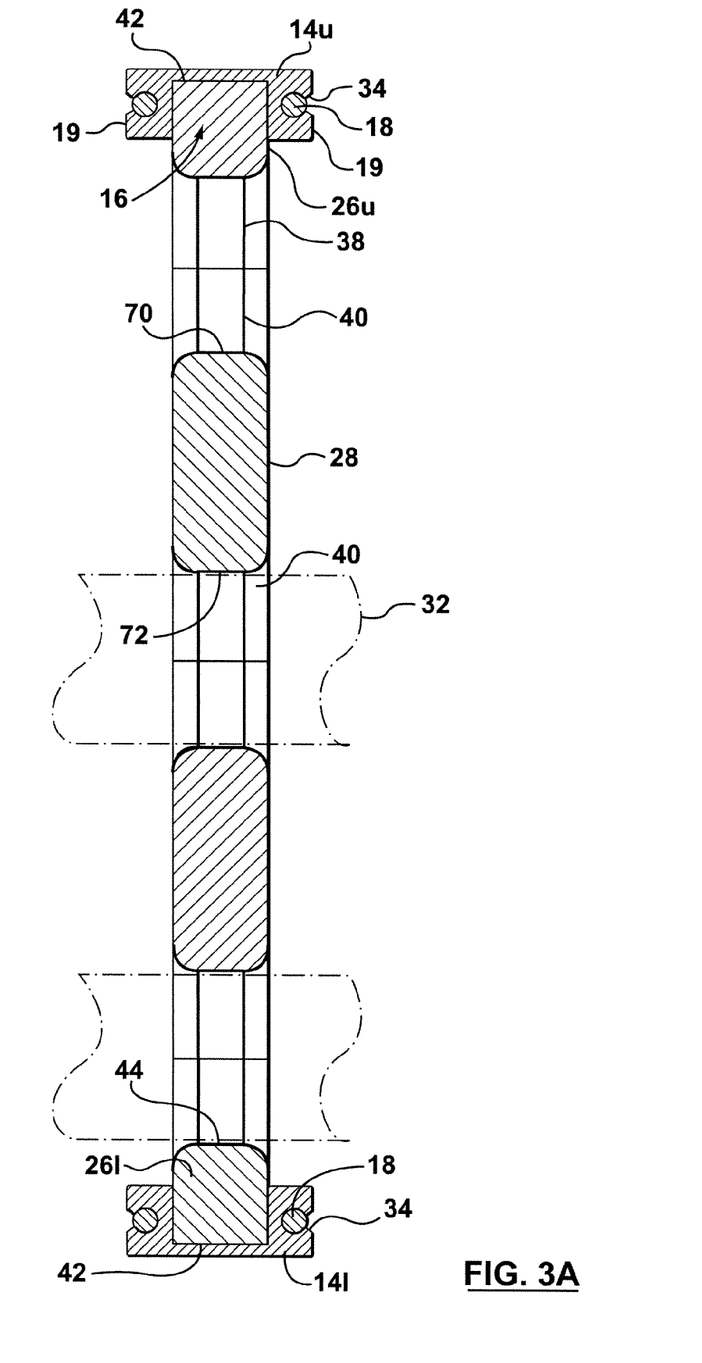
FIG. 3A is a magnified view of FIG. 3.

Turning to FIGS. 2, 3, and 3A, each of rungs 14L and 14U has a U-shaped profile which provides a central channel 16 along the length of each rung. An opening 34 extends along the length of each of the two side arms 19 of each rung. The lowermost support block 26L is fitted into the central channel 16 of the lower rung 14L and the uppermost support block 26U is fitted into the central channel 16 of the upper rung 14U. Each rung is positioned so that its openings 34 are aligned with aligned through bores 50 (FIG. 4) in opposed side rails 12a, 12b. A rod 18 runs through each opening 34 in the rungs and through the through bore 50 (FIG. 4) in each of the side rails 12a, 12b. The rods are threaded and a flange nut 20 is threaded to either end of each rod to attach the rungs to the side rails.

Cable support blocks 26L and 26U are identical in configuration but oriented oppositely. Thus, each of the support blocks 26L, 26U has one straight face 42 (which for block 26L is the lower face and which for block 26U is the upper face) and one face 44 with four semi-circular cut outs 45 (which for block 26L is the upper face and which for block 26U is the lower face). It is the straight face 42 of each block 26L, 26U which is fitted into the channel 16 in a rung 14L, 14U.

Cable support blocks 26L, 26U sandwich cable support blocks 28L, 28U. Cable support blocks 28L and 28U are identical in configuration but oriented oppositely. Thus, each of support blocks 28L and 28U has one face 70 with four semi-circular cut outs 45 (which for block 28L is the lower face and which for block 28U is the upper face) and an opposite face 72 with five semi-circular cut outs 45 (which for block 28L is the upper face and which for block 28U is the lower face). As best illustrated in FIG. 3A, the faces 44, 70, and 72 are radiused at the semi-circular cut-outs to prevent cutting or chafing of the cable insulation. The semi-circular cut-outs in adjacent blocks align to form offset rows of cylindrical openings 60 for receiving cables.

Figure 4:
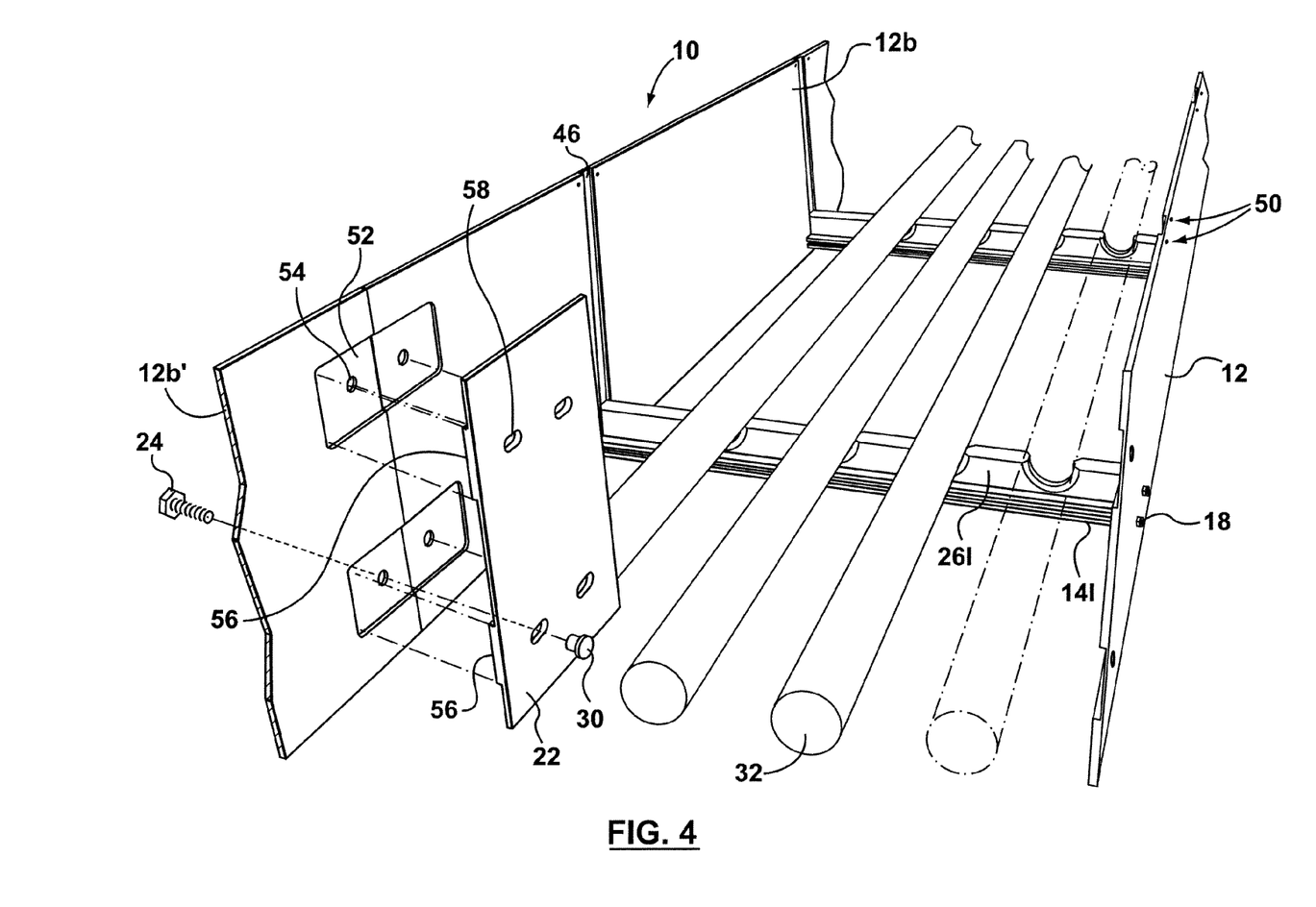
FIGS. 4, 5, and 6 are exploded fragmentary views of a portion of the cable tray of FIG. 1 illustrating assembly of the cable tray.
Figure 7:
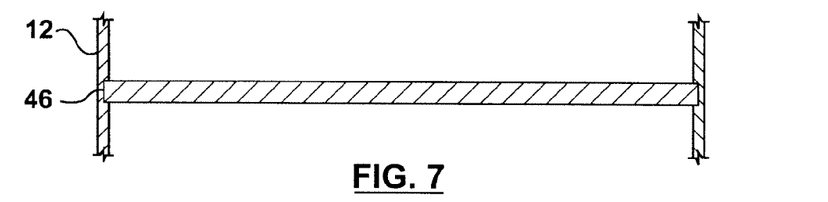
FIG. 7 is a cross-sectional view along the lines 7-7 in FIG. 6.

Turning to FIG. 4, side rails 12a, 12b have opposed inwardly facing channels 46 at the ends of each rung 14L which receive the ends of the support blocks 26, 28. In this regard, as illustrated in FIG. 7, the cable support blocks 26, 28 have a length greater than the spacing between the opposed side rails 12a, 12b but less than the spacing between the bottoms of opposed channels 46 of the side rails.

A pair of inwardly facing depressions 52 extend along each side rail 12a, 12b from each end of each side rail. In consequence, the depressions of a side rail 12b line up with like depressions in a side rail 12b' placed end-to-end with side rail 12b, resulting in extended length depressions. Within each depression 52 of a side rail, a through bore 54 extends through the side rail. A splice plate 22 has a pair of protuberances 56 of complementary width to that of the extended length depressions, with longitudinally extending slots 58 extending through the splice plate at the protuberances. These protuberances of the splice plate may be fit into the extended length depressions with the slots 58 aligning with through bores 54. Bolts 24 (with lock washers—not shown) and grommet nuts 30 may then be joined through each of the aligned through bores 54 and slots 58 to join the splice plate to the side rails 12b, 12b'. The bores 54 may be positioned such that when the end-to-end side rails are joined by a splice plate, there is a gap between the side rails. This gap between the side rails, along with the longitudinally extending slots 58 allows for thermal expansion.

To assemble cable tray 10, with reference to FIGS. 3A and 4, lower rungs 14L are first joined to side rails 12a, 12b by positioning each lower rung so that rods 18 may be inserted through a pair of adjacent through bores 50 in one side rail, through C-shaped openings 34 in the lower rung and out the pair of through bores 50 in the opposite side rail. Flange nuts 20 may then be threaded to the ends of the rods. Next, for each installed lower rung, a lower cable support block 26L may be slid down opposed channels 46 of the side rails 12a, 12b and into channel 16 of the lower rung. Optionally, at this stage, cover sections 17 (FIG. 1) could be installed on the bottom of the partially assembled cable tray. The cable tray, thus far assembled, may then be moved to its installed position and secured in position in any suitable fashion. This may be repeated with an adjacent section of cable tray and the adjacent section joined to the first section by splice plates 22.

Figure 5:
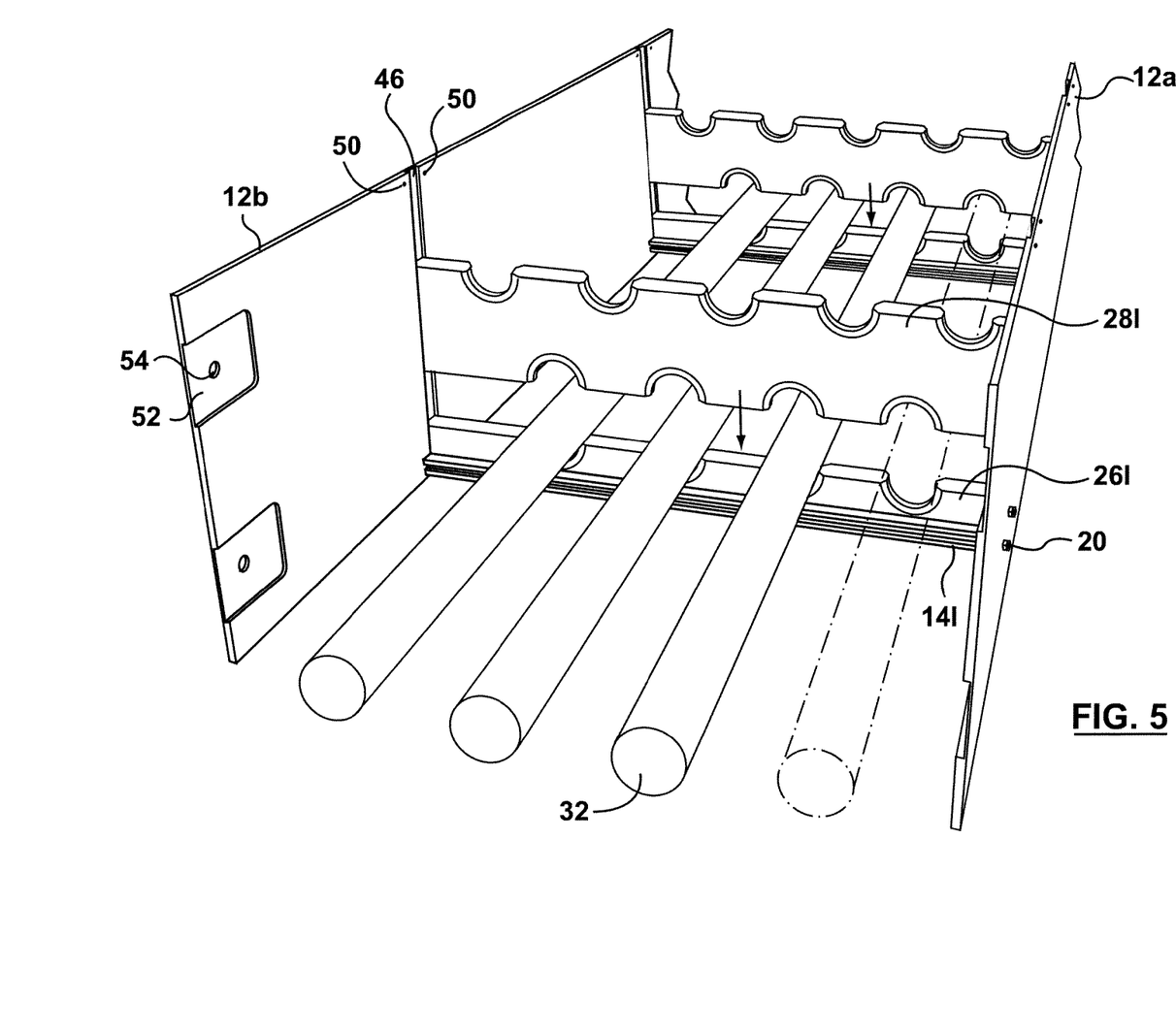
Figure 6:
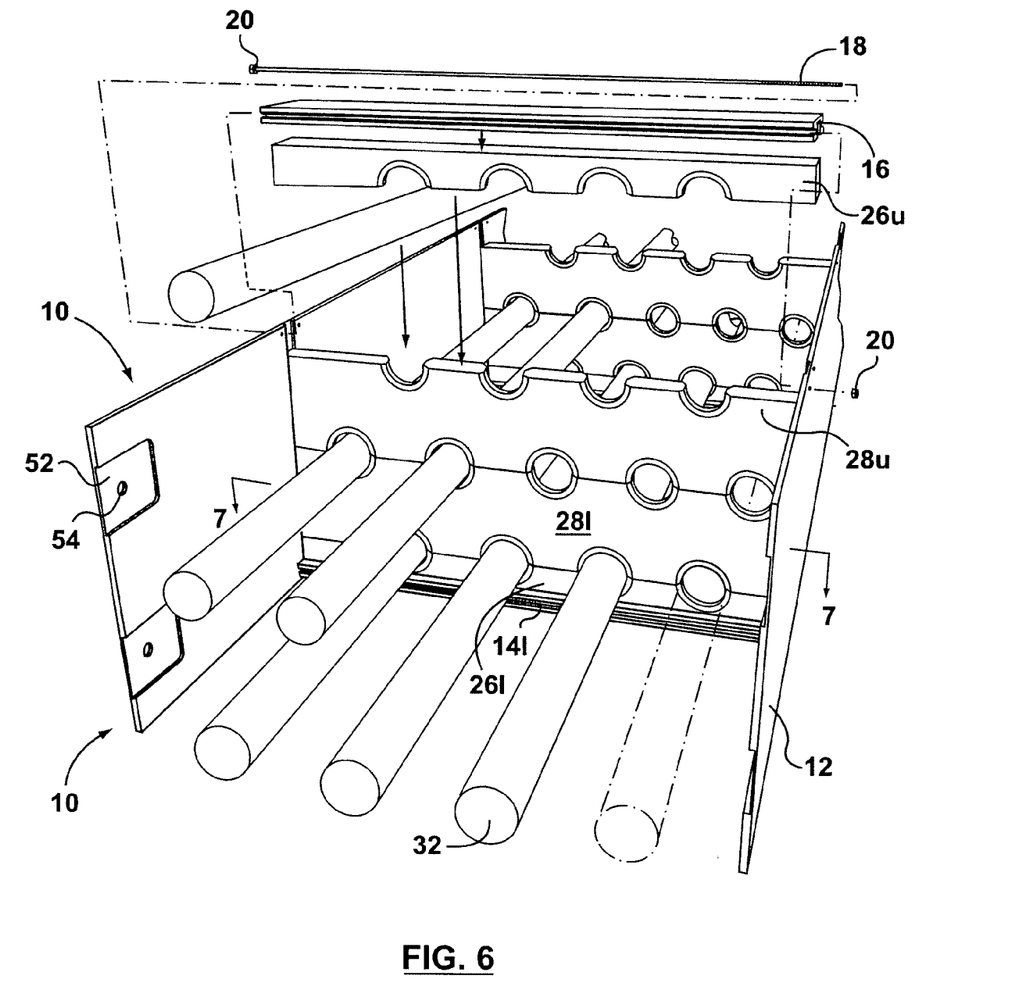

With all of the sections of cable tray secured in position, a first row of cables 32 may be laid into the cable trays such that each cable is received by the semi-circular cut 45 outs of the lower block 26L. Turning to FIG. 5, a cable support block 28L may then be slid down opposed channels 46 in the side rails at each lower rung into abutment with block 26L. In this position, the semi-circular cut outs 45 in block 28L form, with semi-circular cut outs 45 in block 26L, cylindrical openings 60 which confine each cable 32 in the first row of cables. Turning to FIG. 6, a second row of cables 32 may then be laid into the semi-circular cut outs 45 in the top face of block 28L. Thereafter, a cable support block 28U may then be slid down opposed channels 46 in the side rails at each lower rung and into abutment with block 28L. In this position, the semi-circular cut outs 45 in block 28U form, with semi-circular cut outs 45 in block 28L, cylindrical openings 60 which confine each cable 32 in the second row of cables. A third row of cables may then be laid into the semi-circular cut outs 45 in the top face of block 28U. Thereafter, a cable support block 26U may be slid down opposed channels 46 in the side rails at each lower rung and into abutment with block 28U. In this position, the semi-circular cut outs 45 in block 26U form, with semi-circular cut outs 45 in block 28U, cylindrical openings 60 which confine each cable 32 in the third row of cables. Lastly, for each block 26U, an upper rung 14U is positioned so that the top face 42 of block 26U is received by the channel 16 of the upper rung. The upper rung is then joined to side rails 12a, 12b by inserting rods 18 through a pair of adjacent through bores 50 in one side rail, through openings 38 in the upper rung and out the pair of through bores 50 in the opposite side rail. Flange nuts 20 may then be threaded to the ends of the rods. The result is that the support blocks 26, 28 are clamped in place between the rungs 14L, 14U and the blocks 26, 28 hold the cables in place. Lastly, cover sections 17 (FIG. 1) may be installed.

As is apparent from FIG. 2, adjacent rows of cables are staggered in a trefoil formation which balances the electromagnetic fields produced by the power cables thereby lowering system impedance and reducing power losses in addition to optimizing load sharing amongst the cables. Further, this improves heat dissipation of the assembly and reduces the prospects of a flailing cable impacting (and shorting to) another cable. The radiusing of the edges of the openings 60 also help to prevent cable damage.

It will be apparent from the foregoing that cable trays according to this invention ease installation in the field. For instance, assembly does not require any step of partial disassembly and the support blocks will stay in place even in vertically curved cable tray sections.

Numerous modifications may be made without departing from the spirit of the invention.

For example, with wider side rails, a greater number of blocks 28 could be used to increase the number of rows of cables. Also, with narrow side rails, only blocks 26L, 26U could be used to construct a cable tray with one row of cables. Indeed, in a relatively low power application where there is little concern for flailing cable in the event of an electrical fault and where only one row of cables is needed, it may be possible to install only the lower rungs 14L and lower support blocks 26L and simply set the one row of cables into the semi-circular cut outs of the top face of the lower support blocks 26L.

While not preferred, the joining wall of the U-shaped rungs could be thickened and be provided with a single opening in place of openings 38 in the side arms 19 of the rungs. In such instance, the rungs would have a tendency to rotate until stabilized by a support block 26L or 26U being fitted into their central channels 16.

The rungs could have other profiles which provide a channel to support the support blocks and openings to receive the rods.

While the openings 38 have been described as C-shaped, they could have other shapes and could, for example, be cylindrical bores through the rungs. However, a drawback with long bores through the rungs is that any foreign material that found its way into the long bores could jam the rods during installation.

While rods 18 have been described as threaded at both ends to receive nuts, the rods could equally be in the nature of long bolts such that nuts need be threaded to only one end of the rods. Further, a nut with a lock washer could be substituted for the described flange nuts. Alternatively, the rods could clamp the side rails with other mechanisms, such as cams.

Figure 8:
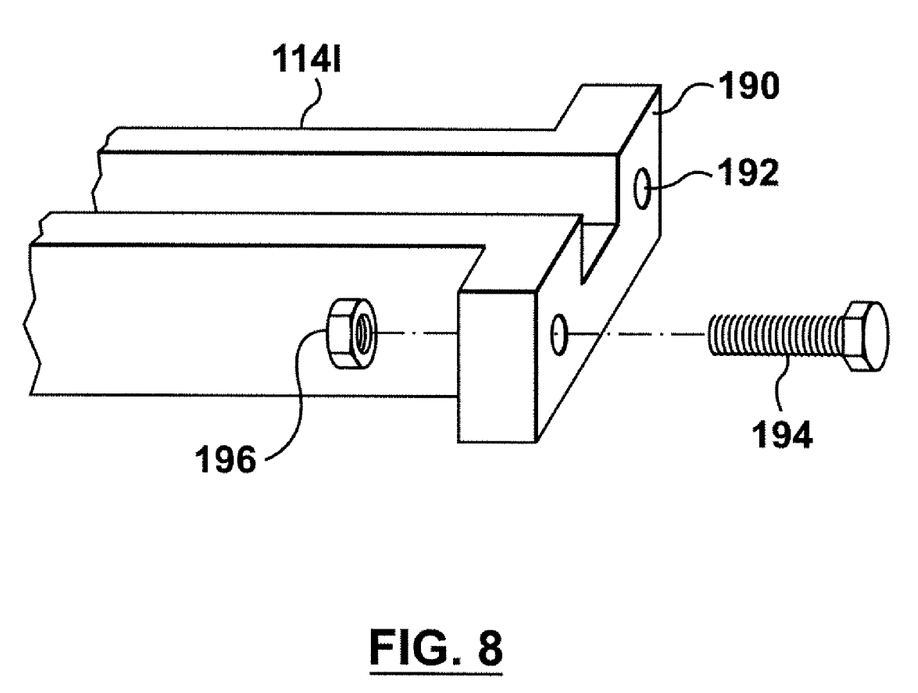
FIG. 8 is a fragmentary perspective view of a portion of a cable tray made in accordance with another embodiment of the invention.

In the alternate embodiment the rungs 14L, 14R do not have openings 34 and the long rods 18 are not used. Instead, as shown in FIG. 8, the rungs 114L have ears 190 at each end with through bores 192. Each through bore 192 aligns with a bore 50 (FIG. 4) in a side plate and a bolt 194 extends through the bore 50 (FIG. 4) and the aligned bore 192 and is held in place by a flange nut 196. Top rung is similarly configured. Alternatively, vertical slots could be cut into rungs 14L, 14R proximate their ends so that the modified rungs could be used with bolts 194 and nuts 196. However, these options considerably complicate installation of the top rung, especially where, as is often the case, the cable tray is proximate the ceiling. Further, this reduces the strength of the assembly. Yet further, in an industrial setting subject to significant vibration, any necessary re-tightening of the nuts 196 as preventative maintenance would be difficult.

Other modifications will be apparent to those skilled in the art and, therefore, the invention is defined in the claims.

What is claimed is:

1. A cable tray comprising:
   a pair of opposed side rails, said rails having a pair of aligned through bores;
   at least one cable support block extending between said pair of opposed side rails;
   a lower rung extending between said pair of opposed rails at said pair of aligned through bores, said lower rung having an upwardly opening channel extending along a length of said lower rung receiving a bottom edge of said at least one cable support block and having an opening extending along said length of said lower rung in alignment with said pair of aligned through bores;
   a rod extending through said opening of said lower rung and through said pair of aligned through bore in said side rails;
   wherein said pair of opposed side rails has opposed inwardly opening channels receiving opposed side edges of said at least one cable support block.

2. The cable tray of claim 1 wherein said pair of through bores of said side rails is a first pair of through bores, said side rails further having a second pair of aligned through bores, said opening of said lower rung is a first opening, said lower rung further having a second opening aligned with said second pair of aligned through bores, said rod is a first rod extending through said first opening and through said first pair of through bores, and further comprising a second rod extending through said second opening and through said second pair of through bores.

3. The cable tray of claim 2 wherein said side rails have a third pair of aligned through bores and further comprising:
   an upper rung extending between said pair of opposed side rails above said lower rung at said third pair of aligned through bores, said upper rung having a downwardly opening channel extending along a length of said upper rung receiving a top edge of said at least one cable support block and a third opening extending along said length of said upper rung in alignment with said third pair of aligned through bores;
   a third rod extending through said third opening and through said third pair of through bores.

4. The cable tray of claim 3 wherein said at least one cable support block has a plurality of openings, each opening for supporting a cable.

5. The cable tray of claim 4 wherein said at least one cable support block comprises a plurality of cable support blocks.

6. The cable tray of claim 5 wherein said side rails have a fourth pair of aligned through bores and wherein said upper rung also extends between said pair of opposed side rails at said fourth pair of aligned through bores, said upper rung having a fourth opening extending along said length of said upper rung in alignment with said fourth pair of aligned through bores;
   a fourth rod extending through said fourth opening and through said fourth pair of through bores.

7. The cable tray of claim 2 wherein said first rod has threaded ends and further comprising a nut threaded to each end of said first rod to join said first rod to said pair of opposed side rails and wherein said second rod has threaded ends and further comprising a nut threaded to each end of said second rod to join said second rod to said pair of opposed side rails.

8. A cable tray comprising:
   a pair of opposed side rails, said rails having a pair of aligned through bores;
   at least one cable support block extending between said pair of opposed side rails;
   a lower rung extending between said pair of opposed rails at said pair of aligned through bores, said lower rung having an upwardly opening channel extending along a length of said lower rung receiving a bottom edge of said at least one cable support block and having an opening extending along said length of said lower rung in alignment with said pair of aligned through bores;
   a rod extending through said opening of said lower rung and through said pair of aligned through bore in said side rails;
   a plate for joining sections of cable tray, one of said plate and a side rail of said pair of opposed side rails having a depression and another of said plate and said side rail having a complementary protuberance for reception in said depression, a protuberance bore extending through said protuberance, a depression bore extending from a base of said depression, and a fastener extending through said protuberance bore and said depression bore.

9. The cable tray of claim 8 wherein one of said protuberance bore and said depression bore is a slot elongated in a longitudinal direction of each side rail.

10. A cable tray comprising:
    a pair of opposed side rails, said rails having a pair of aligned through bores;
    at least one cable support block extending between said pair of opposed side rails;
    a lower rung extending between said pair of opposed rails at said pair of aligned through bores, said lower rung having an upwardly opening channel extending along a length of said lower rung receiving a bottom edge of said at least one cable support block and having at least one opening extending through said lower rung in alignment with said pair of aligned through bores;
    an elongated member extending through at least one said opening of said lower rung and through at least one of said pair of aligned through bores in said side rails;
    wherein said pair of opposed side rails has opposed inwardly opening channels receiving opposed side edges of said at least one cable support block.

11. The cable tray of claim 10 wherein said elongated member is a bolt and further comprising a nut threaded to said bolt at an outside face of one of said opposed side rails.

12. The cable tray of claim 10 wherein said at least one opening is a single opening extending along said length of said lower rung.

13. The cable tray of claim 10 wherein said pair of through bores of said side rails is a first pair of through bores, said side rails further having a second pair of aligned through bores, said at least one opening of said lower rung is a first at least one opening, said lower rung further having a second at least one opening aligned with said second pair of aligned through bores, said elongated member extending through at least one said opening of said lower rung and through at least one of said pair of aligned through bores in said side rails being a first elongated member extending through at least one said first opening of said lower rung and through at least one of said first pair of aligned through bores in said side rails and further comprising a second elongated member extending through at least one said second opening of said lower rung and through at least one of said second pair of aligned through bores in said side rails.

14. The cable tray of claim 13 wherein said side rails have a third pair of aligned through bores and further comprising:
   an upper rung extending between said pair of opposed side rails above said lower rung at said third pair of aligned through bores, said upper rung having a downwardly opening channel extending along a length of said upper rung receiving a top edge of said at least one cable support block and having at least one third opening extending through said lower rung in alignment with said third pair of aligned through bores;
   a third elongated member extending through at least one said opening of said upper rung and through at least one of said third pair of aligned through bores in said side rails.

15. The cable tray of claim 14 wherein said at least one cable support block has a plurality of openings, each opening for supporting a cable.

16. The cable tray of claim 15 further comprising a plate for joining sections of cable tray, one of said plate and a side rail of said pair of opposed side rails having a depression and another of said plate and said side rail having a complementary protuberance for reception in said depression, a protuberance bore extending through said protuberance, a depression bore extending from a base of said depression, and a fastener extending through said protuberance bore and said depression bore.

17. The cable tray of claim 16 wherein one of said protuberance bore and said depression bore is a slot elongated in a longitudinal direction of each side rail.

* * * * *